US010574350B2

(12) United States Patent
Fan et al.

(10) Patent No.: US 10,574,350 B2
(45) Date of Patent: Feb. 25, 2020

(54) METHOD AND APPARATUS FOR ESTIMATING DIRECT CURRENT BIAS OF OPTICAL MODULATOR AND RECEIVER

(71) Applicant: Fujitsu Limited, Kawasaki-shi, Kanagawa (JP)

(72) Inventors: Yangyang Fan, Beijing (CN); Liang Dou, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/367,384

(22) Filed: Mar. 28, 2019

(65) Prior Publication Data

US 2019/0222308 A1 Jul. 18, 2019

Related U.S. Application Data

(63) Continuation of application No. PCT/CN2016/102684, filed on Oct. 20, 2016.

(51) Int. Cl.
*H04B 10/00* (2013.01)
*H04B 10/07* (2013.01)
(Continued)

(52) U.S. Cl.
CPC ......... *H04B 10/07* (2013.01); *H04B 10/0799* (2013.01); *H04B 10/50575* (2013.01);
(Continued)

(58) Field of Classification Search
USPC ........................................................ 398/198
See application file for complete search history.

(56) References Cited

U.S. PATENT DOCUMENTS

| 6,539,038 B1 * | 3/2003 | Wilkerson, Jr. ...... G02F 1/0123 |
| | | 372/25 |
| 7,184,671 B2 * | 2/2007 | Wang ................... H04B 10/503 |
| | | 398/195 |

(Continued)

FOREIGN PATENT DOCUMENTS

| CN | 101634759 | 1/2010 |
| CN | 103117967 | 5/2013 |

(Continued)

OTHER PUBLICATIONS

Sekine, Kenro, et al. "A Novel Bias Control Technique for MZ Modulator with Monitoring Power of Backward Light for Advanced Modulation Formats", Optical Society of America, 1-55752-830-6, Apr. 2007, 3 pgs. †.

(Continued)

*Primary Examiner* — Agustin Bello
(74) *Attorney, Agent, or Firm* — Staas & Halsey LLP

(57) ABSTRACT

A method and apparatus estimating direct current bias of an optical modulator and a receiver. The method includes: performing signal processing to obtain a phase noise compensated signal, extracting a receiving signal component based on the phase noise compensated signal, removing the receiving signal component from the phase noise compensated signal, and calculating a received signal power based on the signal with the receiving signal component being removed. The method includes calculating a direct current bias of the optical modulator based on the receiving signal component, the received signal power and a drive signal power of the optical modulator.

17 Claims, 7 Drawing Sheets

(51) Int. Cl.
  *H04B 10/516* (2013.01)
  *H04B 10/60* (2013.01)
  *H04B 10/564* (2013.01)
  *H04B 10/50* (2013.01)
  *H04B 10/69* (2013.01)
  *H04B 10/61* (2013.01)
  *H04B 10/079* (2013.01)

(52) U.S. Cl.
  CPC ......... *H04B 10/516* (2013.01); *H04B 10/564* (2013.01); *H04B 10/60* (2013.01); *H04B 10/616* (2013.01); *H04B 10/6971* (2013.01)

(56) References Cited

U.S. PATENT DOCUMENTS

| | | | | |
|---|---|---|---|---|
| 8,600,199 | B2* | 12/2013 | Morishita | G02F 1/0121 385/2 |
| 8,977,119 | B2* | 3/2015 | Yan | H04B 10/50575 398/185 |
| 9,094,243 | B2* | 7/2015 | Hou | H04L 27/0014 |
| 9,490,901 | B2* | 11/2016 | Zhao | H04B 10/0795 |
| 2007/0212075 | A1* | 9/2007 | Yin | G02F 1/0123 398/183 |
| 2008/0075470 | A1* | 3/2008 | Ohira | H04B 10/505 398/183 |
| 2010/0080571 | A1* | 4/2010 | Akiyama | G02F 1/0123 398/184 |
| 2012/0008963 | A1* | 1/2012 | Aruga | H04B 10/5053 398/183 |
| 2012/0087617 | A1* | 4/2012 | Morishita | G02F 1/0121 385/3 |
| 2012/0301153 | A1* | 11/2012 | Takeguchi | H04B 10/5053 398/135 |
| 2014/0010533 | A1* | 1/2014 | Yan | H04B 10/564 398/38 |
| 2014/0233963 | A1* | 8/2014 | Le Taillandier De Gabory | H04B 10/541 398/183 |
| 2014/0334529 | A1* | 11/2014 | Hou | H04L 27/0014 375/226 |
| 2015/0318921 | A1* | 11/2015 | Zhao | H04B 10/0795 398/25 |
| 2016/0173304 | A1* | 6/2016 | Le Taillandier De Gabory | H04B 10/50575 398/76 |
| 2018/0074348 | A1* | 3/2018 | Fujita | H04B 10/516 |
| 2018/0323878 | A1* | 11/2018 | Kawakami | H04B 10/516 |
| 2019/0036611 | A1* | 1/2019 | Fujita | H04B 10/516 |
| 2019/0222308 | A1* | 7/2019 | Fan | H04B 10/07 |

FOREIGN PATENT DOCUMENTS

| | | |
|---|---|---|
| CN | 103532633 | 1/2014 |
| CN | 105099544 | 11/2015 |
| EP | 2148235 | 1/2010 |

OTHER PUBLICATIONS

Petrou, Constantinos S. et al. "Quadrature Imbalance Compensation for PDM QPSK Coherent Optical Systems", IEEE Photonics Technology Letters, vol. 21, No. 24, pp. 1876-1878, Dec. 15, 2008 †.

Li, Lei. et al., "Wide-Range, Accurate and Simple Digital Frequency Offset Compensator for Optical Coherent Receivers", Optical Fiber Communication Conference, Feb. 2008, OWT4., 3 pgs. †.

Li, J. et al.,"Laser-Linewidth-Tolerant Feed-Forward Carrier Phase Estimator With Reduced Complexity for QAM", Journal of Lightwave Technology, vol. 29, No. 16, Aug. 2011, pp. 2358-2364 †.

Louchet, H. et al., "Improved DSP algorithms for coherent 16-QAM transmission", European Conference and Exposition on Optical Communications, Sep. 2008, vol. 2, No. 57, Tu.1. E.6, pp. 1-2 †.

Yan, W. et al., "Low Complexity Digital Perturbation Back-propagation", European Conference and Exposition on Optical Communications, Sep. 2011, Tu.3.A.2., 3 pgs. †.

International Search Report dated Jul. 12, 2017 in corresponding International Application No. PCT/CN2016/102684.

* cited by examiner

METHOD AND APPARATUS FOR ESTIMATING DIRECT CURRENT BIAS OF OPTICAL MODULATOR AND RECEIVER

CROSS-REFERENCE TO RELATED APPLICATIONS

This application is a continuation application of PCT International Patent Application No. PCT/CN2016/102684, filed Oct. 20, 2016, in the State Intellectual Property Office of China, the disclosure of which is incorporated herein by reference.

TECHNICAL FIELD

This disclosure relates to the field of optical communication technologies, and in particular to a method and apparatus for estimating direct current bias of an optical modulator and a receiver.

BACKGROUND

Mach-Zehnder modulators (MZMs) are widely used in fiber-optic communication systems. In a coherent optical fiber communication system, two parallel MZMs and a 90-degree phase shifter are usually used to form an in-phase quadrature (IQ) Mach-Zehnder modulator (IQ-MZM) to respectively modulate in-phase and quadrature components of a complex signal.

FIG. 1 is a schematic diagram of a structure of an optical modulator in a polarization multiplexing system, in which a case of dual polarization states (denoted by h and v) is shown. A structure of an IQ-MZM is as shown by dotted lines in FIG. 1. As shown in FIG. 1, s(t) is a drive signal of the MZM, and D is an optimal direct current bias voltage. Whatever it is used for single polarization modulation or for dual polarization modulation (for example, as shown in FIG. 1), each MZM in the IQ-MZM usually operates independently at respective optimal direct current bias point. However, due to environmental changes and device aging, the direct current bias of the MZM will drift. As shown in FIG. 1, ε denotes the direct current bias induced by the drift.

The direct current bias induced by the drift may affect a modulation performance, thereby bringing about damage to system performance. Especially, with gradual upgrade of modulation formats, such as 16 quadrature amplitude modulation (QAM), 32 QAM, or even formats of higher orders, the system is increasingly sensitive to the MZM direct current drift.

It should be noted that the above description of the background is merely provided for clear and complete explanation of this disclosure and for easy understanding by those skilled in the art. And it should not be understood that the above technical solution is known to those skilled in the art as it is described in the background of this disclosure.

Documents advantageous to understanding of this disclosure and conventional technologies are listed below, which are incorporated herein by reference, as they are fully described in this text.

[1] U.S. Pat. No. 6,539,038, James Allan Wilkerson, et al. "Reference frequency quadrature phase-based control of drive level and DC bias of laser modulator".

[2] Kenro Sekine, et al. "A Novel Bias Control Technique for MZ Modulator with Monitoring Power of Backward Light for Advanced Modulation Formats", OSA 1-55752-830-6.

[3] Constantinos S. Petrou, et al. "Quadrature Imbalance Compensation for PDM QPSKCoherent Optical Systems", IEEE Photon. Technol. Lett., vol. 21, no. 24, pp. 1876-1878, Dec. 15, 2008

[4] L. Li et al., "Wide-Range, Accurate and Simple Digital Frequency Offset Compensator for Optical Coherent Receivers", OFC2008, OWT4.

[5] J. Li et al., "Laser-Linewidth-Tolerant Feed-Forward Carrier Phase Estimator With Reduced Complexity for QAM", JLT 29, pp. 2358, 2011.

[6] H. Louchet et al., "Improved DSP algorithms for coherent 16-QAM transmission", ECOC2008, Tu.1. E.6

[7] W Yan et al., "Low Complexity Digital Perturbation Back-propagation", ECOC2011, Tu.3.A.2.

SUMMARY

It was found by the inventors that at present, in order to ensure a stable bias, an MZM is usually subjected to automatic bias control at a transmitting device, such as by using a control scheme based on a pilot and power, in which a direct current bias cannot be estimated and compensated with simple and efficient structures and operations.

Embodiments of this disclosure provide a method and apparatus for estimating direct current bias of an optical modulator and a receiver, in which digital signal processing (DSP) is used at a receiving device of a signal to estimate direct current bias at a transmitting device induced by drift.

According to an embodiment of this disclosure, there is provided a method for estimating direct current bias of an optical modulator, applicable to a receiving device converting a received optical signal into an electrical signal, the method for estimating including:

performing signal processing on the electrical signal to obtain a phase noise compensated signal;

extracting a receiving signal component to which a direct current component corresponds based on the phase noise compensated signal, the direct current component being introduced into a transmitting device due to bias drift of an optical modulator of the transmitting device;

removing the receiving signal component to which the direct current component corresponds from the phase noise compensated signal;

calculating a received signal power based on the signal with the receiving signal component to which the direct current component corresponds being removed; and calculating a direct current bias of the optical modulator of the transmitting device based on the receiving signal component to which the direct current component corresponds, the received signal power and a drive signal power of the optical modulator of the transmitting device.

According to a second aspect of the embodiments of this disclosure, there is provided an apparatus for estimating direct current bias of an optical modulator, configured in a receiving device converting a received optical signal into an electrical signal, the apparatus for estimating including:

a signal processor configured to perform signal processing on the electrical signal to obtain a phase noise compensated signal;

a signal extractor configured to extract a receiving signal component to which a direct current component corresponds based on the phase noise compensated signal, the direct current component being introduced into a transmitting device due to bias drift of an optical modulator of the transmitting device;

a signal remover configured to remove the receiving signal component to which the direct current component corresponds from the phase noise compensated signal;

a power calculator configured to calculate a received signal power based on the signal with the receiving signal component to which the direct current component corresponds being removed; and a bias calculator configured to calculate a direct current bias of the optical modulator of the transmitting device based on the receiving signal component to which the direct current component corresponds, the received signal power and a drive signal power of the optical modulator of the transmitting device.

According to a third aspect of the embodiments of this disclosure, there is provided a receiver, including:

an optical-to-electrical converter configured to convert a received optical signal into an electrical signal; and a digital signal processor configured to perform signal processing on the electrical signal to obtain a phase noise compensated signal, extract a receiving signal component to which a direct current component corresponds based on the phase noise compensated signal, the direct current component being introduced into a transmitter due to bias drift of an optical modulator of the transmitter, remove the receiving signal component to which the direct current component corresponds from the phase noise compensated signal, calculate a received signal power based on the signal with the receiving signal component to which the direct current component corresponds being removed, and calculate a direct current bias of the optical modulator of the transmitter based on the receiving signal component to which the direct current component corresponds, the received signal power and a drive signal power of the optical modulator of the transmitter.

An advantage of the embodiments of this disclosure exists in: extracting a receiving signal component to which a direct current component corresponds based on the phase noise compensated signal, the direct current component being introduced into a transmitting device due to bias drift of an optical modulator of the transmitting device, calculating a received signal power based on the signal with the receiving signal component being removed, and calculating direct current bias of the optical modulator of the transmitting device based on the receiving signal component to which the direct current component corresponds, the received signal power and a drive signal power of the optical modulator of the transmitting device. Hence, digital signal processing may be used at a receiving device of a signal to estimate direct current bias at a transmitting device induced by drift, and the direct current bias may be estimated and compensated with simple and efficient structures and operations.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, operations, steps or components but does not preclude the presence or addition of one or more other features, integers, operations, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Embodiment 1

Figure 2:
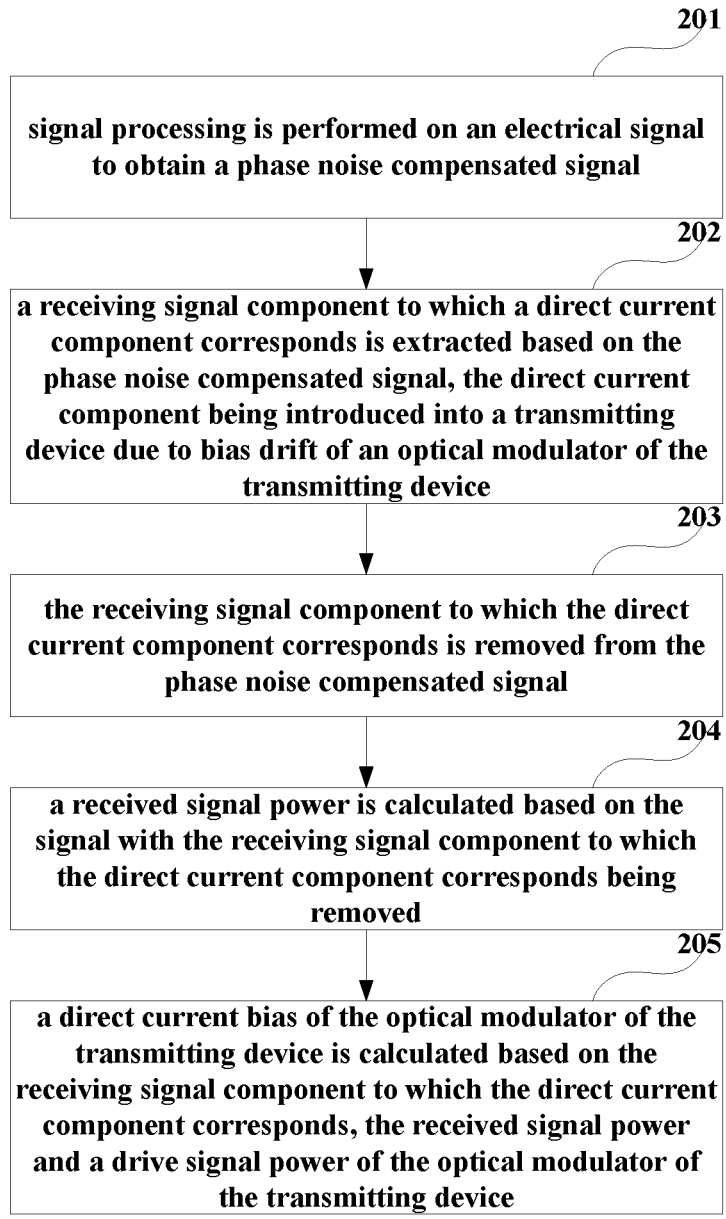
FIG. 2 is a flowchart of a method for estimating direct current bias of an optical modulator according to an embodiment of this disclosure.

These embodiments of this disclosure provide a method for estimating direct current bias of an optical modulator, applicable to a receiving device (receiver) converting a received optical signal into an electrical signal. FIG. 2 is a flowchart of the method for estimating direct current bias of an optical modulator of the embodiment of this disclosure. As shown in FIG. 2, the method includes operations illustrated by blocks 201-205 as follows:

Block 201: signal processing is performed on an electrical signal to obtain a phase noise compensated signal.

Block 202: a receiving signal component to which a direct current component corresponds is extracted based on the phase noise compensated signal, the direct current component being introduced into a transmitting device (transmitter) due to bias drift of an optical modulator of the transmitting device.

Block 203: the receiving signal component to which the direct current component corresponds is removed from the phase noise compensated signal.

Block 204: a received signal power is calculated based on the signal with the receiving signal component to which the direct current component corresponds being removed; and Block 205: a direct current bias of the optical modulator of the transmitting device is calculated based on the receiving signal component to which the direct current component corresponds, the received signal power and a drive signal power of the optical modulator of the transmitting device.

Figure 1:
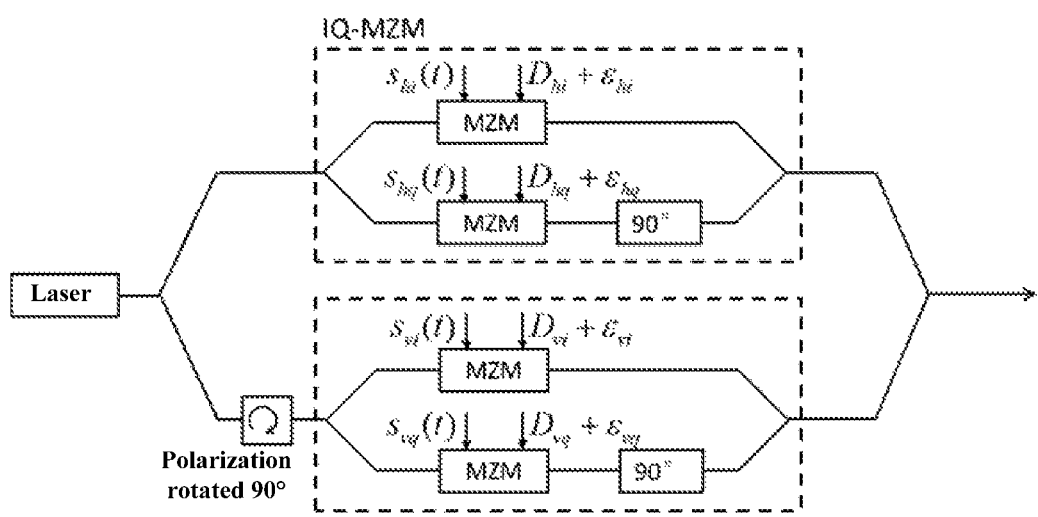
FIG. 1 is a schematic diagram of a structure of an optical modulator in a polarization multiplexing system.

In an embodiment, relationships between the signals shall be described first by taking the MZM structure of the dual polarization states shown in FIG. 1 as an example.

According to a modulation characteristic of sin(•) of the MZM, a transmission model as shown in formula (1) may be set up for a plurality of paths of signals (hi, hq, vi, vq) shown in FIG. 1.

$$k * \sin\left[\frac{\pi}{2V_\pi}(s(t) + \varepsilon)\right] + n = r(t); \quad (1)$$

where, s(t) denotes the drive signal of the optical modulator of the transmitting device, carrying information to be transmitted, ε denotes the direct current bias of the optical modulator of the transmitting device, $V_\pi$ denotes a half-wave voltage of the optical modulator of the transmitting device, n denotes a total noise of a path through which s(t) passes, r(t) denotes the electrical signal of the receiving device, i.e. estimation of the transmission signal s(t) by the receiver, and k denotes an adjustment factor between the electrical signal of the receiving device and the drive signal of the optical modulator of the transmitting device.

In a practical system, the drive signal has a zero mean value E[s(t)]=0 (the operator E[•] denoting an expected or mean value), and its voltage range is within a half-wave voltage, that is, |s(t)|≤$V_\pi$, hence, $$E\left[\sin\left(\frac{\pi}{2V_\pi}s(t)\right)\right] = 0$$

is tenable.

Usually, the noise n has a zero mean value and is unrelated to signals. At these signal and noise characteristics, it may be assumed that a bias drift angle $$\phi_\varepsilon = \frac{\pi\varepsilon}{2V_\pi}$$

is a small quantity (e.g. a small quantity relative to a predetermined threshold), and a power of the noise is much smaller than a power of the signal.

According to the above model, the receiving signal component to which the direct current component corresponds and a drive signal power of the optical modulator of the transmitting device may satisfy a relationship as below:

$$\frac{\pi\varepsilon}{2V_\pi} * k * \left\{1 - 0.5 * \left(\frac{\pi}{2V_\pi}\right)^2 * E[s^2(t)]\right\} = E[r(t)]; \quad (2)$$

where, E[s²(t)] denotes the drive signal power, and E[r(t)] denotes the receiving signal component to which the direct current component corresponds.

And a received signal power and the drive signal power of the optical modulator of the transmitting device may satisfy a relationship as below:

$$\left(\frac{\pi}{2V_\pi}\right)^2 * k^2 * E[s^2(t)] = E[r^2(t)]; \quad (3)$$

where, E[s²(t)] denotes the drive signal power, and E[r²(t)] denotes the received signal power.

The bias drift angle or a magnitude of a voltage may be obtained by combining formulae (2) and (3), as shown in formula (4). That is, the direct current bias of the optical modulator of the transmitting device may be calculated by using formula (4) below:

$$|\phi_\varepsilon| = \frac{\pi}{2V_\pi}|\varepsilon| = \frac{\pi}{2V_\pi} * \frac{|E[r(t)]|}{E[r^2(t)]} \frac{\sqrt{E[s^2(t)]}}{\left|1 - \frac{1}{2}\left(\frac{\pi}{2V_\pi}\right)^2 E[s^2(t)]\right|}; \quad (4)$$

where, E[s²(t)] denotes the drive signal power of the optical modulator of the transmitting device, E[r²(t)] denotes the received signal power, and E[r(t)] denotes the receiving signal component to which the direct current component corresponds.

It should be noted that above formulae (1) to (4) are only practical examples of the embodiment of this disclosure. However, this disclosure is not limited thereto; for example, appropriate adjustment or modification may be made to the above formulae according to an actual situation, such as changing one or more parameters therein.

In a coherent fiber-optic communication system, when a frequency offset between a local oscillator laser of the receiving device and a laser of the transmitting device is relatively small, the adjustment factor k may be deemed as being a positive number, hence, a sign of the bias drift may be determined by a sign of a mean value of the received signal. According to formula (4), after sampling output of an analog-to-digital converter (ADC) of the receiver is acquired, damages in the signals may be compensated, so as to acquire direct current components in each path introduced by the bias drift and power after the signals are recovered.

In an embodiment, the half-wave voltage $V_\pi$ of the MZM and the drive signal power E[s²(t)] in formula (4) may be provided by the transmitter. And reference may be made to related techniques for how to acquire, which shall not be described herein any further.

How to estimate the bias drift at the receiving device shall be further described below.

In one embodiment, the signal is a single polarization state signal, that is, the optical communication system is a single polarization state system.

Figure 3:
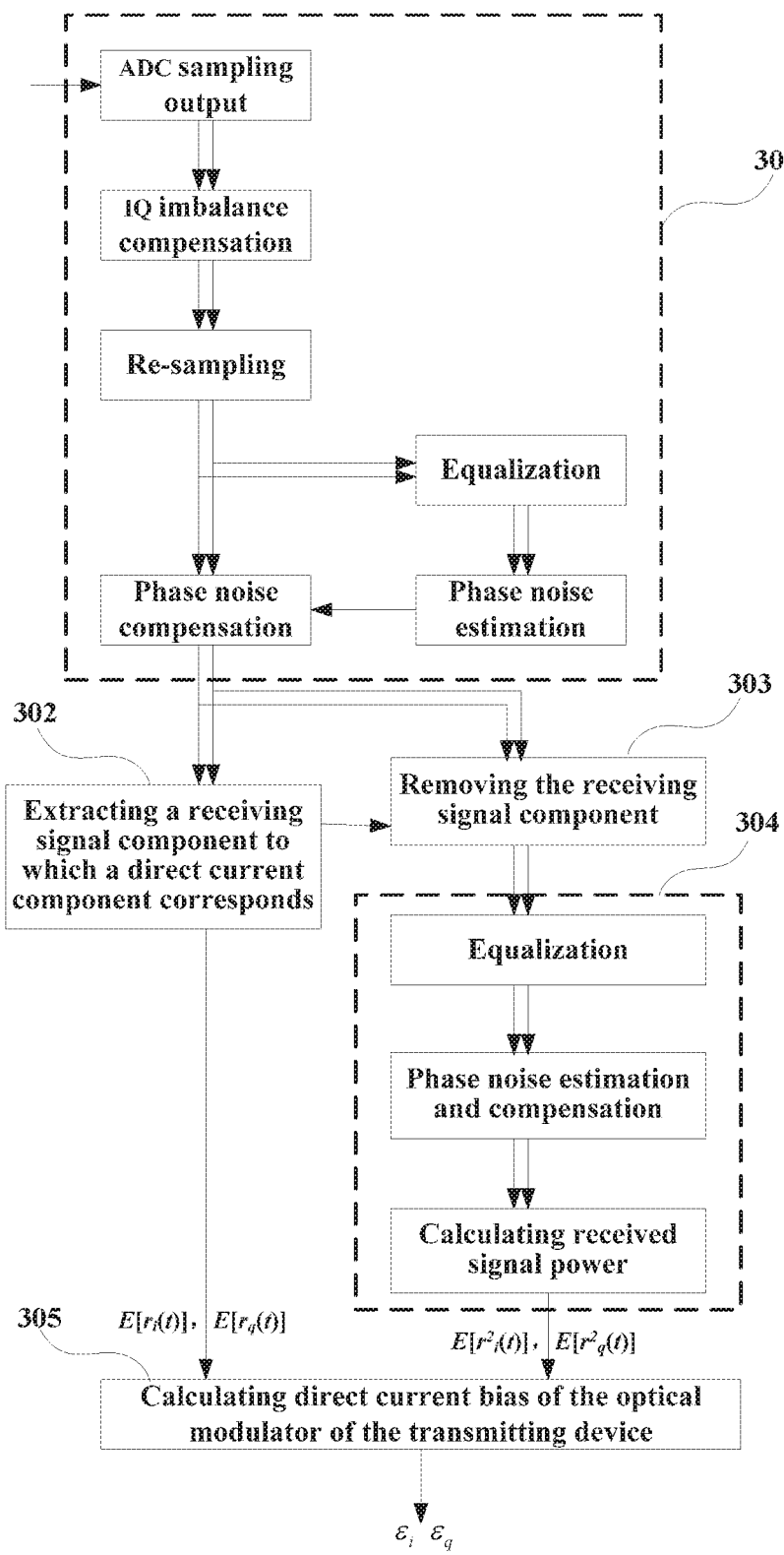
FIG. 3 is another flowchart of a method for estimating direct current bias of an optical modulator according to an embodiment of this disclosure.

FIG. 3 is another flowchart of the method for estimating direct current bias of an optical modulator of the embodiment of this disclosure, in which the blocks or operations in FIG. 2 are refined by taking single polarization state modulation as an example.

As shown in FIG. 3, the performing signal processing on the electrical signal to obtain a phase noise compensated signal in block 301 may include: performing sampling by using an analog-to-digital converter (ADC), performing in-phase quadrature (IQ) imbalance compensation and re-sampling, performing equalization (first time of equalization) and phase noise estimation (first time of phase noise estimation), and performing phase noise compensation (first time of phase noise compensation).

In this embodiment, in order to recover at the receiving device the direct current components in each path of the transmitting device introduced by the bias drift, it is needed to compensate for damages caused by a fiber-optic effect, and system damages induced by a frequency offset and line width of a laser, and receiver IQ imbalance, etc., to which the signals are subjected, as shown in FIG. 3.

The compensation for the IQ imbalance of the receiver may be performed by using the relevant art; and phase noises may be extracted from the signal subjected to re-sampling and equalization, the phase noises including those introduced by the frequency offset and line width of the laser, which may be estimated by any related methods in the relevant art. Furthermore, the equalization shown in FIG. 3 includes compensation for linear or nonlinear effects of the fiber-optic effect, which may also be realized by using the relevant art. And particular contents of how to realize shall not be described herein any further.

As shown in FIG. 3, in block 302, the receiving signal component to which the direct current component corresponds may be extracted based on the phase noise compensated signal, the direct current component being introduced into the transmitting device due to the bias drift of the optical modulator of the transmitting device.

For example, the phase noise compensated signal may be averaged in a time domain, so as to extract the receiving signal component to which the direct current component corresponds. However, this disclosure is not limited thereto, and any related methods for extracting a signal component in the relevant art may be used.

As shown in FIG. 3, after block 302, receiving signal components $E[r_i(t)]$ and $E[r_q(t)]$ to which the direct current component corresponds may be obtained.

As shown in FIG. 3, the calculating a received signal power based on the signal with the receiving signal component to which the direct current component corresponds being removed (at block 303) may include block 304 may include: performing equalization (second time of equalization) on the signal with the receiving signal component to which the direct current component corresponds being removed, performing phase noise estimation (second time of phase noise estimation) and phase noise compensation (second time of phase noise compensation), and calculating the received signal power based on the phase noise compensated signal.

For example, the signal that is phase noise compensated again may be squared in the time domain, so as to calculate the received signal power. However, this disclosure is not limited thereto, and any related methods for calculating power in the relevant art may be used.

As shown in FIG. 3, after block 304, received signal power $E[r^2_i(t)]$ and $E[r^2_q(t)]$ may be obtained.

Hence, direct current bias $\varepsilon_i$ and $\varepsilon_q$ of the optical modulator of the transmitting device may be calculated according to formula (4) at block 305.

In another embodiment, the signal is a dual polarization state signal, that is, the optical communication system is a dual polarization state system.

Figure 4:
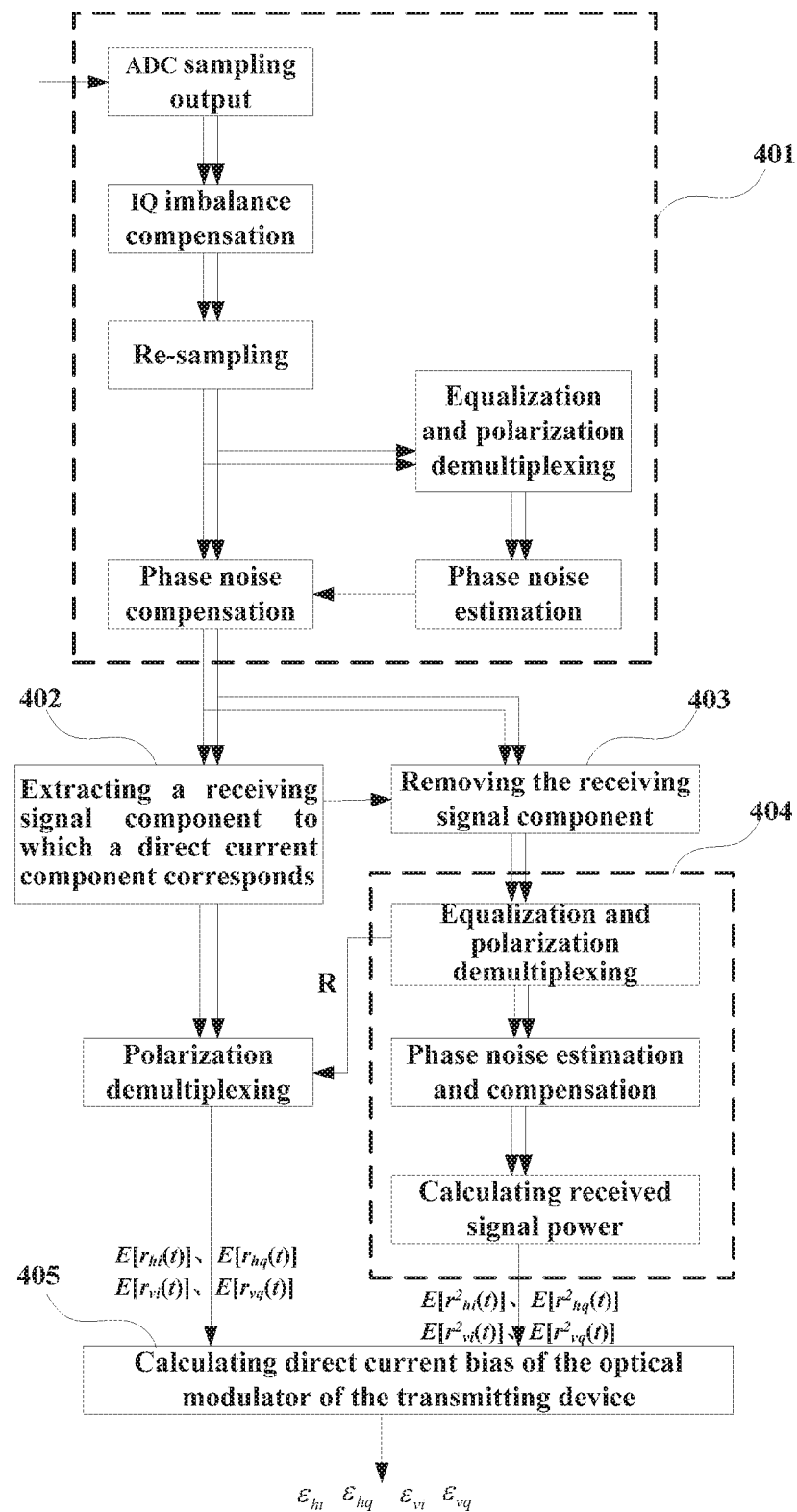
FIG. 4 is a further flowchart of a method for estimating direct current bias of an optical modulator according to an embodiment of this disclosure.

FIG. 4 is a further flowchart of the method for estimating direct current bias of an optical modulator of the embodiment of this disclosure, in which the blocks or operations in FIG. 2 are refined by taking dual polarization state modulation as an example.

As shown in FIG. 4, the performing signal processing on the electrical signal to obtain a phase noise compensated signal in block 401 may include: performing sampling by using an analog-to-digital converter (ADC), performing in-phase quadrature (IQ) imbalance compensation and re-sampling, performing equalization and polarization demultiplexing (first time of equalization and polarization demultiplexing) and phase noise estimation (first time of phase noise estimation), and performing phase noise compensation (first time of phase noise compensation).

In this embodiment, in order to recover at the receiving device the direct current components in each path of the transmitting device introduced by the bias drift, it is needed to compensate for damages caused by a fiber-optic effect, and system damages induced by a frequency offset and line width of a laser, and receiver IQ imbalance, etc., to which the signals are subjected, as shown in FIG. 4.

The compensation for the IQ imbalance of the receiver may be performed by using the relevant art; and phase noises may be extracted from the signal subjected to re-sampling and equalization, the phase noises including those introduced by the frequency offset and line width of the laser, which may be estimated by any related methods in the relevant art. Furthermore, the equalization shown in FIG. 4 includes compensation for linear or nonlinear effects of the fiber-optic effect, which may also be realized by using the relevant art. And particular contents of how to realize shall not be described herein any further.

As shown in FIG. 4, in block 402, the receiving signal component to which the direct current component corresponds may be extracted based on the phase noise compensated signal, the direct current component being introduced into the transmitting device due to the bias drift of the optical modulator of the transmitting device.

For example, the phase noise compensated signal may be averaged in a time domain, so as to extract the receiving signal component to which the direct current component corresponds. However, this disclosure is not limited thereto, and any related methods for extracting a signal component in the relevant art may be used.

As shown in FIG. 4, after block 402, bias demultiplexing needs to be performed, so as to obtain receiving signal components $E[r_{hi}(t)]$, $E[r_{hq}(t)]$, $E[r_{vi}(t)]$ and $E[r_{vq}(t)]$ to which the direct current component corresponds.

The receiving signal components to which the direct current component correspond may be multiplied by a response matrix R, so as to perform the polarization demultiplexing, the response matrix R being a response at a zero frequency to a filter $$\begin{bmatrix} H_{xx}(f) & H_{yx}(f) \\ H_{xy}(f) & H_{yy}(f) \end{bmatrix}$$

performing the equalization and the polarization demultiplexing on the signal with the receiving signal components to which the direct current component corresponds being removed, that is, $$R = \begin{bmatrix} H_{xx}(f=0) & H_{yx}(f=0) \\ H_{xy}(f=0) & H_{yy}(f=0) \end{bmatrix}.$$

As shown in FIG. 4, the calculating a received signal power based on the signal with the receiving signal component to which the direct current component corresponds being removed (block 403) may include block 404 including: performing equalization and polarization demultiplexing (second time of equalization and polarization demultiplexing) on the signal with the receiving signal component to which the direct current component corresponds being removed, performing phase noise estimation (second time of phase noise estimation) and phase noise compensation (second time of phase noise compensation), and calculating the received signal power based on the phase noise compensated signal.

For example, the signal that is phase noise compensated again may be squared in the time domain, so as to calculate the received signal power. However, this disclosure is not limited thereto, and any related methods for calculating power in the relevant art may be used.

As shown in FIG. 4, after block 404, received signal power $E[r^2_{hi}(t)]$, $E[r^2_{hq}(t)]$, $E[r^2_{vi}(t)]$ and $E[r^2_{vq}(t)]$ may be obtained Hence, direct current bias $\varepsilon_{hi}$, $\varepsilon_{hq}$, $\varepsilon_{vi}$ and $\varepsilon_{vq}$ of the optical modulator of the transmitting device may be calculated according to formula (4) at block 405.

It should be noted that the embodiment of this disclosure is only illustrated in FIGS. 3 and 4; however, this disclosure is not limited thereto. For example, an order of execution of the blocks or operations may be appropriately adjusted; and furthermore, some other blocks or operations may be added, or some of these blocks or operations may be reduced. And appropriate variants may be made by those skilled in the art according to what is described above, without being limited to the disclosure contained in the above figures.

It can be seen from the above embodiment that the receiving signal component to which the direct current component corresponds is extracted based on the phase noise compensated signal, the direct current component being introduced into the transmitting device due to the bias drift of the optical modulator of the transmitting device, the received signal power is calculated based on the signal with the receiving signal component being removed, and the direct current bias of the optical modulator of the transmitting device is calculated based on the receiving signal component to which the direct current component corresponds, the received signal power and the drive signal power of the optical modulator of the transmitting device. Hence, digital signal processing may be used at a receiving device of a signal to estimate direct current bias at a transmitting device induced by drift, and the direct current bias may be estimated and compensated with simple and efficient structures and operations.

Embodiment 2

These embodiments of this disclosure provide an apparatus for estimating direct current bias of an optical modulator, configured in a receiving device converting a received optical signal into an electrical signal, with contents in the embodiments of this disclosure identical to those in Embodiment 1 being not going to be described herein any further.

Figure 5:
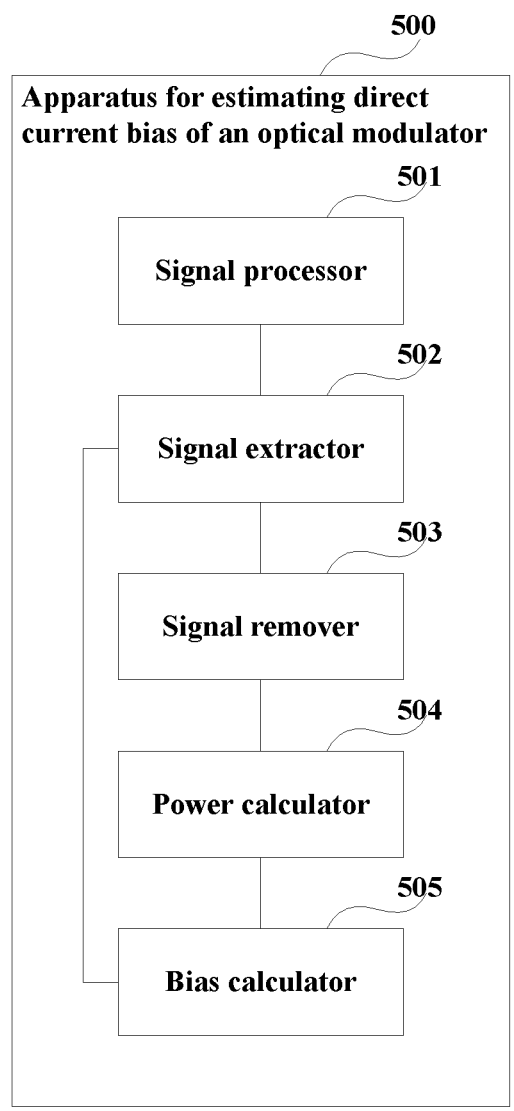
FIG. 5 is a schematic diagram of an apparatus for estimating direct current bias of an optical modulator according to an embodiment of this disclosure.

FIG. 5 is a schematic diagram of the apparatus for estimating direct current bias of an optical modulator of the embodiment of this disclosure. As shown in FIG. 5, the apparatus 500 for estimating direct current bias of an optical modulator includes:

a signal processor 501 configured to perform signal processing on the electrical signal to obtain a phase noise compensated signal;

a signal extractor 502 configured to extract a receiving signal component to which a direct current component corresponds based on the phase noise compensated signal, the direct current component being introduced into a transmitting device due to bias drift of an optical modulator of the transmitting device;

a signal remover 503 configured to remove the receiving signal component to which the direct current component corresponds from the phase noise compensated signal;

a power calculator 504 configured to calculate a received signal power based on the signal with the receiving signal component to which the direct current component corresponds being removed; and a bias calculator 505 configured to calculate a direct current bias of the optical modulator of the transmitting device based on the receiving signal component to which the direct current component corresponds, the received signal power and a drive signal power of the optical modulator of the transmitting device.

In an embodiment, a drive signal of the optical modulator of the transmitting device and the electrical signal of the receiving device satisfy a relationship as below:

$$k * \sin\left[\frac{\pi}{2V_\pi}(s(t) + \varepsilon)\right] + n = r(t);$$

where, s(t) denotes the drive signal of the optical modulator of the transmitting device, $\varepsilon$ denotes the direct current bias of the optical modulator of the transmitting device, $V_\pi$ denotes a half-wave voltage of the optical modulator of the transmitting device, n denotes a total noise of a path through which s(t) passes, r(t) denotes the electrical signal of the receiving device, and k denotes an adjustment factor between the electrical signal of the receiving device and the drive signal of the optical modulator of the transmitting device.

In an embodiment, the receiving signal component to which the direct current component corresponds and the drive signal power of the optical modulator of the transmitting device satisfy a relationship as below:

$$\frac{\pi \varepsilon}{2V_\pi} * k * \left\{1 - 0.5 * \left(\frac{\pi}{2V_\pi}\right)^2 * E[s^2(t)]\right\} = E[r(t)];$$

where, $E[s^2(t)]$ denotes the drive signal power, and $E[r(t)]$ denotes the receiving signal component to which the direct current component corresponds.

In an embodiment, the received signal power and the drive signal power of the optical modulator of the transmitting device satisfy a relationship as below:

$$\left(\frac{\pi}{2V_\pi}\right)^2 * k^2 * E[s^2(t)] = E[r^2(t)];$$

where, $E[s^2(t)]$ denotes the drive signal power, and $E[r^2(t)]$ denotes the received signal power.

In an embodiment, the bias calculator 505 may calculate the direct current bias of the optical modulator of the transmitting device by using a formula as below:

$$|\phi_\varepsilon| = \frac{\pi}{2V_\pi}|\varepsilon| = \frac{\pi}{2V_\pi} * \frac{|E[r(t)]|}{E[r^2(t)]} \frac{\sqrt{E[s^2(t)]}}{\left|1 - \frac{1}{2}\left(\frac{\pi}{2V_\pi}\right)^2 E[s^2(t)]\right|};$$

where, $E[s^2(t)]$ denotes the drive signal power of the optical modulator of the transmitting device, $E[r^2(t)]$ denotes the received signal power, and $E[r(t)]$ denotes the receiving signal component to which the direct current component corresponds.

In one embodiment, the electrical signal is a single polarization state signal;

the signal processor 501 may be configured to: perform sampling by using an analog-to-digital converter, perform in-phase quadrature imbalance compensation and re-sampling, perform equalization and phase noise estimation, and perform phase noise compensation;

and the power calculator 504 may be configured to: perform equalization on the signal with the receiving signal component to which the direct current component corresponds being removed, perform phase noise estimation and phase noise compensation, and calculate the received signal power based on the phase noise compensated signal.

In another embodiment, the electrical signal is a dual polarization state signal.

Figure 6:
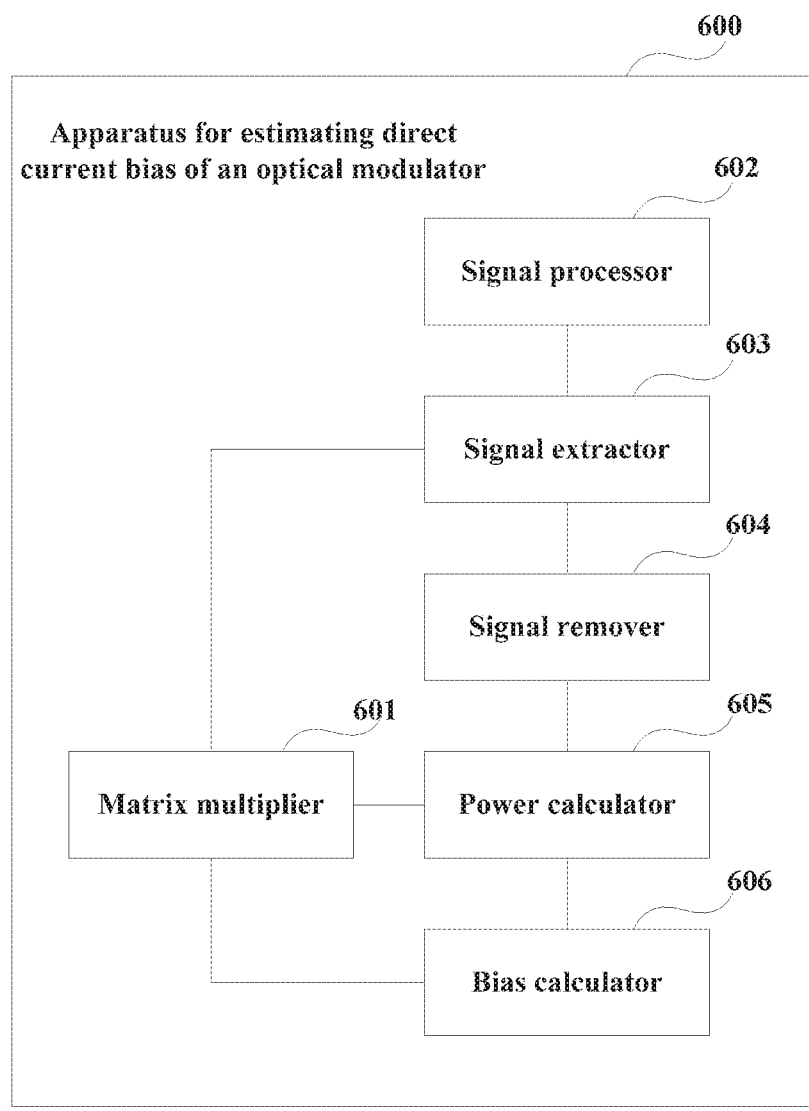
FIG. 6 is another schematic diagram of an apparatus for estimating direct current bias of an optical modulator according to an embodiment of this disclosure.

FIG. 6 is another schematic diagram of the apparatus for estimating direct current bias of an optical modulator of the embodiment of this disclosure, in which a case of a dual polarization state system is shown. As shown in FIG. 6, the apparatus 600 for estimating direct current bias of an optical modulator includes a signal processor 602, a signal extractor 603, a signal remover 604, a power calculator 605 and a bias calculator 606, as described above.

In this embodiment, the signal processor 602 may be configured to: perform sampling by using an analog-to-digital converter, perform in-phase quadrature imbalance compensation and re-sampling, perform equalization, polarization demultiplexing and phase noise estimation, and perform phase noise compensation.

The power calculator 605 may be configured to: perform equalization and polarization demultiplexing on the signal with the receiving signal component to which the direct current component corresponds being removed; perform phase noise estimation and phase noise compensation; and calculate the received signal power based on the phase noise compensated signal.

As shown in FIG. 6, the apparatus 600 for estimating direct current bias of an optical modulator may further include:

a matrix multiplier 601 configured to multiply the receiving signal components to which the direct current component corresponds by a response matrix, to perform the polarization demultiplexing;

wherein, the response matrix R is a response at a zero frequency to a filter $$\begin{bmatrix} H_{xx}(f) & H_{yx}(f) \\ H_{xy}(f) & H_{yy}(f) \end{bmatrix}$$

performing the equalization and the polarization demultiplexing on the signal with the receiving signal component to which the direct current component corresponds being removed, that is, $$R = \begin{bmatrix} H_{xx}(f=0) & H_{yx}(f=0) \\ H_{xy}(f=0) & H_{yy}(f=0) \end{bmatrix}.$$

It should be noted that the embodiment of this disclosure is only illustrated in FIGS. 5 and 6; however, this disclosure is not limited thereto. For example, some other elements may be added, or some of these elements may be reduced. And appropriate variants may be made by those skilled in the art according to what is described above, without being limited to the disclosure contained in the above figures.

It can be seen from the above embodiment that the receiving signal component to which the direct current component corresponds is extracted based on the phase noise compensated signal, the direct current component being introduced into the transmitting device due to the bias drift of the optical modulator of the transmitting device, the received signal power is calculated based on the signal with the receiving signal component being removed, and the direct current bias of the optical modulator of the transmitting device is calculated based on the receiving signal component to which the direct current component corresponds, the received signal power and the drive signal power of the optical modulator of the transmitting device. Hence, digital signal processing may be used at a receiving device of a signal to estimate direct current bias at a transmitting device induced by drift, and the direct current bias may be estimated and compensated with simple and efficient structures and operations.

Embodiment 3

These embodiments of this disclosure provide a receiver, which may be configured with an apparatus 500 or 600 for estimating direct current bias of an optical modulator described in Embodiment 2, with contents in those embodiments identical those in embodiments 1 and 2 being not going to be described herein any further.

Figure 7:
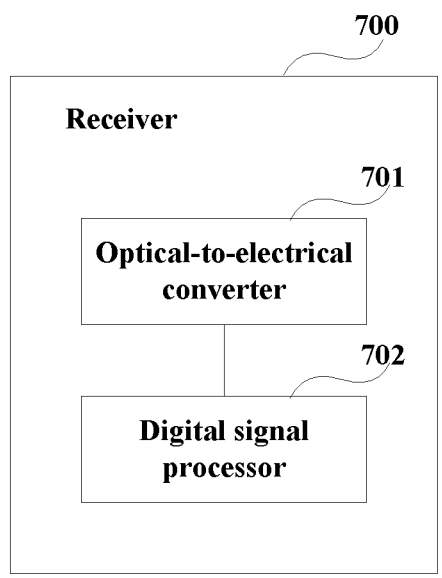
FIG. 7 is a schematic diagram of a receiver according to an embodiment of this disclosure.

FIG. 7 is a schematic diagram of the receiver of the embodiment of this disclosure. As shown in FIG. 7, a receiver 700 may include:

an optical-to-electrical converter 701 configured to convert a received optical signal into an electrical signal; and a digital signal processor 702 configured to perform signal processing on the electrical signal to obtain a phase noise compensated signal, extract a receiving signal component to which a direct current component corresponds based on the phase noise compensated signal, the direct current component being introduced into a transmitter due to bias drift of an optical modulator of the transmitter, remove the receiving signal component to which the direct current component corresponds from the phase noise compensated signal, calculate a received signal power based on the signal with the receiving signal component to which the direct current component corresponds being removed, and calculate a direct current bias of the optical modulator of the transmitter based on the receiving signal component to which the direct current component corresponds, the received signal power and a drive signal power of the optical modulator of the transmitter.

In an embodiment, the optical-to-electrical converter 701 may be configured with an MZM, and the digital signal processor 702 may execute the functions/operations described above by using the DSP technique.

The embodiment of this disclosure further provides an optical communication system.

Figure 8:
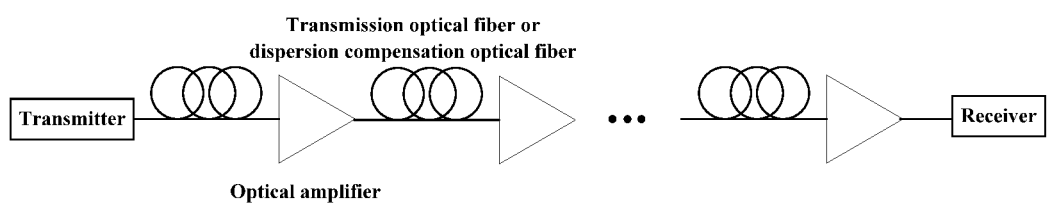
FIG. 8 is a schematic diagram of an optical communication system according to an embodiment of this disclosure.

FIG. 8 is a schematic diagram of the optical communication system of the embodiment of this disclosure. As shown in FIG. 8, a signal transmitted by a transmitter may arrive at a receiver after passing through different devices (such as an optical fiber, an optical amplifier, and a dispersion compensation optical fiber) in a transmission link. The transmitter and/or receiver are/is configured with MZM(s), and the receiver includes the digital signal processor 702 described above.

The above apparatus and method of this disclosure may be implemented by hardware, or by hardware in combination with software. The present disclosure relates to such a computer-readable program that when the program is executed by a logic device, the logic device is enabled to carry out the apparatus or components as described above, or to carry out the methods or operations as described above. The present disclosure also relates to a storage medium for storing the above program, such as a hard disk, a floppy disk, a CD, a DVD, and a flash memory.

The method/apparatus described with reference to the embodiments of this disclosure may be directly embodied as hardware, software modules executed by a processor, or a combination thereof. For example, one or more functional block diagrams and/or one or more combinations of the functional block diagrams shown in FIG. 5 may either correspond to software modules of procedures of a computer program, or correspond to hardware modules. Such software modules may respectively correspond to the operations shown in FIG. 2. And the hardware module, for example, may be carried out by firming the soft modules by using a field programmable gate array (FPGA).

The soft modules may be located in an RAM, a flash memory, an ROM, an EPROM, and an EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the figures may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the figures may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. A method estimating direct current bias of an optical modulator, applicable to a receiving device that converts an optical signal that is received into an electrical signal, the method for estimating comprising:
   performing signal processing on the electrical signal to obtain a phase noise compensated signal;
   extracting a receiving signal component corresponding to a direct current component based on the phase noise compensated signal, the direct current component being introduced into a transmitting device due to bias drift of an optical modulator of the transmitting device;
   removing the receiving signal component corresponding to the direct current component from the phase noise compensated signal;
   calculating a received signal power based on the electrical signal with the receiving signal component corresponding to the direct current component being removed; and
   calculating a direct current bias of the optical modulator of the transmitting device based on the receiving signal component corresponding to the direct current component, the received signal power and a drive signal power of the optical modulator of the transmitting device.

2. The method according to claim 1, wherein a drive signal of the optical modulator of the transmitting device and the electrical signal of the receiving device satisfy a relationship as below:

$$k * \sin\left[\frac{\pi}{2V_\pi}(s(t)+\varepsilon)\right] + n = r(t);$$

where, s(t) denotes the drive signal of the optical modulator of the transmitting device, ε denotes the direct current bias of the optical modulator of the transmitting device, $V_\pi$ denotes a half-wave voltage of the optical modulator of the transmitting device, n denotes a total noise of a path through which s(t) passes, r(t) denotes the electrical signal of the receiving device, and k denotes an adjustment factor between the electrical signal of the receiving device and the drive signal of the optical modulator of the transmitting device.

3. The method according to claim 2, wherein the receiving signal component corresponding to the direct current component and the drive signal power of the optical modulator of the transmitting device satisfy a relationship as below:

$$\frac{\pi\varepsilon}{2V_\pi} * k * \left\{1 - 0.5 * \left(\frac{\pi}{2V_\pi}\right)^2 * E[s^2(t)]\right\} = E[r(t)];$$

where, $E[s^2(t)]$ denotes the drive signal power, and E[r(t)] denotes the receiving signal component corresponding to the direct current component.

4. The method according to claim 2, wherein the received signal power and the drive signal power of the optical modulator of the transmitting device satisfy a relationship as below:

$$\left(\frac{\pi}{2V_\pi}\right)^2 * k^2 * E[s^2(t)] = E[r^2(t)];$$

where, $E[s^2(t)]$ denotes the drive signal power, and $E[r^2(t)]$ denotes the received signal power.

5. The method according to claim 2, wherein the direct current bias of the optical modulator of the transmitting device is calculated by using a formula as below:

$$|\phi_\varepsilon| = \frac{\pi}{2V_\pi}|\varepsilon| = \frac{\pi}{2V_\pi} * \frac{|E[r(t)]|}{E[r^2(t)]} \frac{\sqrt{E[s^2(t)]}}{\left|1 - \frac{1}{2}\left(\frac{\pi}{2V_\pi}\right)^2 E[s^2(t)]\right|};$$

where, $E[s^2(t)]$ denotes the drive signal power of the optical modulator of the transmitting device, $E[r^2(t)]$ denotes the received signal power, and $E[r(t)]$ denotes the receiving signal component corresponding to the direct current component.

6. The method according to claim 1, wherein the electrical signal is a single polarization state signal,
the performing of signal processing on the electrical signal to obtain the phase noise compensated signal comprises:
performing sampling by using an analog-to-digital converter,
performing in-phase quadrature imbalance compensation and re-sampling,
performing equalization and phase noise estimation, and
performing phase noise compensation; and
the calculating of the received signal power based on the electrical signal with the receiving signal component corresponding to the direct current component being removed comprises:
performing equalization on the electrical signal with the receiving signal component corresponding to the direct current component being removed,
performing phase noise estimation and phase noise compensation, and
calculating the received signal power based on the phase noise compensated signal.

7. The method according to claim 1, wherein the electrical signal is a dual polarization state signal,
the performing of signal processing on the electrical signal to obtain the phase noise compensated signal, comprises:
performing sampling by using an analog-to-digital converter, performing in-phase quadrature imbalance compensation and re-sampling,
performing equalization, polarization demultiplexing and phase noise estimation, and performing phase noise compensation; and
the calculating of the received signal power based on the electrical signal with the receiving signal component corresponding to the direct current component being removed comprises:
performing equalization and polarization demultiplexing on the electrical signal with the receiving signal component corresponding to the direct current component being removed,
performing phase noise estimation and phase noise compensation, and
calculating the received signal power based on the phase noise compensated signal.

8. The method according to claim 7, wherein the method further comprises:

multiplying the receiving signal components corresponding to the direct current component by a response matrix, to perform the polarization demultiplexing;
wherein, the response matrix R is a response at a zero frequency to a filter $$\begin{bmatrix} H_{xx}(f) & H_{yx}(f) \\ H_{xy}(f) & H_{yy}(f) \end{bmatrix}$$

performing the equalization and the polarization demultiplexing on the signal with the receiving signal component corresponding to the direct current component being removed, that is, $$R = \begin{bmatrix} H_{xx}(f=0) & H_{yx}(f=0) \\ H_{xy}(f=0) & H_{yy}(f=0) \end{bmatrix}.$$

9. An apparatus estimating direct current bias of an optical modulator, configured in a receiving device converting an optical signal into an electrical signal, the apparatus comprising:
a memory;
a signal processor to the memory, the signal processor configured to:
perform signal processing on the electrical signal to obtain a phase noise compensated signal;
extract a receiving signal component corresponding to a direct current component based on the phase noise compensated signal, the direct current component being introduced into a transmitting device due to bias drift of an optical modulator of the transmitting device;
remove the receiving signal component corresponding to the direct current component from the phase noise compensated signal;
calculate a received signal power based on the electrical signal with the receiving signal component corresponding to the direct current component being removed; and
calculate a direct current bias of the optical modulator of the transmitting device based on the receiving signal component corresponding to the direct current component, the received signal power and a drive signal power of the optical modulator of the transmitting device.

10. The apparatus according to claim 9, wherein a drive signal of the optical modulator of the transmitting device and the electrical signal of the receiving device satisfy a relationship as below:

$$k * \sin\left[\frac{\pi}{2V_\pi}(s(t) + \varepsilon)\right] + n = r(t);$$

where, $s(t)$ denotes the drive signal of the optical modulator of the transmitting device, $\varepsilon$ denotes the direct current bias of the optical modulator of the transmitting device, $V_\pi$ denotes a half-wave voltage of the optical modulator of the transmitting device, $n$ denotes a total noise of a path through which $s(t)$ passes, $r(t)$ denotes the electrical signal of the receiving device, and $k$ denotes an adjustment factor between the electrical signal of the receiving device and the drive signal of the optical modulator of the transmitting device.

11. The apparatus according to claim 10, wherein the receiving signal component corresponding to the direct current component and the drive signal power of the optical modulator of the transmitting device satisfy a relationship as below:

$$\frac{\pi \varepsilon}{2V_\pi} * k * \left\{1 - 0.5 * \left(\frac{\pi}{2V_\pi}\right)^2 * E[s^2(t)]\right\} = E[r(t)];$$

where, $E[s^2(t)]$ denotes the drive signal power, and $E[r(t)]$ denotes the receiving signal component corresponding to the direct current component.

12. The apparatus according to claim 10, wherein the received signal power and the drive signal power of the optical modulator of the transmitting device satisfy a relationship as below:

$$\left(\frac{\pi}{2V_\pi}\right)^2 * k^2 * E[s^2(t)] = E[r^2(t)];$$

where, $E[s^2(t)]$ denotes the drive signal power, and $E[r^2(t)]$ denotes the received signal power.

13. The apparatus according to claim 10, wherein the bias calculator is configured to calculate the direct current bias of the optical modulator of the transmitting device by using a formula as below:

$$|\phi_\varepsilon| = \frac{\pi}{2V_\pi}|\varepsilon| = \frac{\pi}{2V_\pi} * \frac{|E[r(t)]|}{E[r^2(t)]} \frac{\sqrt{E[s^2(t)]}}{\left|1 - \frac{1}{2}\left(\frac{\pi}{2V_\pi}\right)^2 E[s^2(t)]\right|};$$

where, $E[s^2(t)]$ denotes the drive signal power of the optical modulator of the transmitting device, $E[r^2(t)]$ denotes the received signal power, and $E[r(t)]$ denotes the receiving signal component corresponding to the direct current component.

14. The apparatus according to claim 9, wherein the electrical signal is a single polarization state signal; the signal processor is configured to:
perform sampling by using an analog-to-digital converter,
perform in-phase quadrature imbalance compensation and re-sampling,
perform equalization and phase noise estimation, and
perform phase noise compensation, and the power calculator is configured to:
perform equalization on the signal with the receiving signal component corresponding to the direct current component being removed,
perform phase noise estimation and phase noise compensation, and
calculate the received signal power based on the phase noise compensated signal.

15. The apparatus according to claim 9, wherein the electrical signal is a dual polarization state signal; the signal processor is configured to:
perform sampling by using an analog-to-digital converter,
perform in-phase quadrature imbalance compensation and re-sampling,
perform equalization, polarization demultiplexing and phase noise estimation, and
perform phase noise compensation; and the power calculator is configured to:
perform equalization and polarization demultiplexing on the signal with the receiving signal component corresponding to the direct current component being removed;
perform phase noise estimation and phase noise compensation; and
calculate the received signal power based on the phase noise compensated signal.

16. The apparatus according to claim 15, wherein the apparatus for estimating further comprises:
a matrix multiplier configured to multiply the receiving signal components corresponding to the direct current component corresponds by a response matrix, to perform the polarization demultiplexing;
wherein, the response matrix R is a response at a zero frequency to a filter $$\begin{bmatrix} H_{xx}(f) & H_{yx}(f) \\ H_{xy}(f) & H_{yy}(f) \end{bmatrix}$$

performing the equalization and the polarization demultiplexing on the signal with the receiving signal component corresponding to the direct current component being removed, that is, $$R = \begin{bmatrix} H_{xx}(f=0) & H_{yx}(f=0) \\ H_{xy}(f=0) & H_{yy}(f=0) \end{bmatrix}.$$

17. A receiver, comprising:
an optical-to-electrical converter configured to convert a received optical signal into an electrical signal; and
a digital signal processor configured to:
perform signal processing on the electrical signal to obtain a phase noise compensated signal,
extract a receiving signal component corresponding to a direct current component based on the phase noise compensated signal, the direct current component being introduced into a transmitter due to bias drift of an optical modulator of the transmitter,
remove the receiving signal component corresponding to the direct current component from the phase noise compensated signal,
calculate a received signal power based on the electrical signal with the receiving signal component corresponding to the direct current component being removed, and
calculate a direct current bias of the optical modulator of the transmitter based on the receiving signal component corresponding to the direct current component, the received signal power and a drive signal power of the optical modulator of the transmitter.

* * * * *